United States Patent
Szortyka et al.

(10) Patent No.: US 9,020,457 B2
(45) Date of Patent: Apr. 28, 2015

(54) PHASED-ARRAY RECEIVER FOR MM-WAVE APPLICATIONS

(71) Applicants: IMEC, Leuven (BE); Vrije Universiteit Brussel, Brussels (BE)

(72) Inventors: Viki Szortyka, Leuven (BE); Piet Wambacq, Groot-Bijgaarden (BE)

(73) Assignees: IMEC, Leuven (BE); Vrije Universiteit Brussel, Brussels (BE)

( * ) Notice: Subject to any disclaimer, the term of this patent is extended or adjusted under 35 U.S.C. 154(b) by 0 days.

(21) Appl. No.: 13/918,621

(22) Filed: Jun. 14, 2013

(65) Prior Publication Data
US 2013/0337757 A1    Dec. 19, 2013

(30) Foreign Application Priority Data

Jun. 15, 2012  (EP) .................................... 12172269
Oct. 24, 2012  (EP) .................................... 12189720

(51) Int. Cl.
| | |
|---|---|
| H04B 1/06 | (2006.01) |
| H04B 7/00 | (2006.01) |
| H04B 1/18 | (2006.01) |
| H04B 7/08 | (2006.01) |

(52) U.S. Cl.
CPC .................. H04B 1/18 (2013.01); H04B 7/084 (2013.01); H04B 7/0885 (2013.01)

(58) Field of Classification Search
CPC ......... H03G 5/26; H03G 3/22; H03G 3/3052; H03G 3/3068; H04B 1/28; H04B 1/30
USPC ........ 455/230, 232.1, 233.1, 234.1, 323, 333, 455/334, 338–340; 375/345
See application file for complete search history.

(56) References Cited

U.S. PATENT DOCUMENTS

2003/0207679 A1    11/2003   Kaczynski et al.

FOREIGN PATENT DOCUMENTS

EP         2267919 A1    12/2010

OTHER PUBLICATIONS

European Search Report, European Patent Application No. 12189720.1 dated May 21, 2013.
Hosoya, Masahiro et al., "A 900-MHz Bandwidth Analog Baseband Circuit with 1-dB Step and 30-dB Gain Dynamic Range", ESSCIRC, Proceedings of the IEEE, Sep. 14, 2010, pp. 466-469.
Yu, Yikun et al., "A 60 GHz Phase Shifter Integrated With LNA and PA in 65 nm CMOS for Phased Array Systems", IEEE Journal of Solid-State Circuits, vol. 45, No. 9, Sep. 2010, pp. 1697-1709.

(Continued)

*Primary Examiner* — Nhan Le
(74) *Attorney, Agent, or Firm* — McDonnell Boehnen Hulbert & Berghoff LLP (57) ABSTRACT

The present disclosure relates to a circuit for providing a signal gain, comprising: a first stage comprising a first set of variable gain transconductors arranged for receiving an input signal and for performing phase-shifting of the input signal, thereby producing an intermediate signal, and a second stage, comprising a second set of transconductors and a plurality of capacitors arranged for receiving the intermediate signal and for providing an output signal to a combiner, wherein the first stage and second stage together form a filter, and wherein the first set of variable gain transconductors and at least one of the transconductors of the second set define the signal gain of the circuit.

16 Claims, 7 Drawing Sheets

(56) References Cited

OTHER PUBLICATIONS

Natarajan, Arun et al., "A Fully-Integrated 16-Element Phased-Array Receiver in SiGe BiCMOS for 60 GHz Communications", IEEE Journal of Solid-States Circuits, vol. 46, No. 5, May 2011, pp. 1059-1075.

Marcu, Cristian et al., "A 90 nm CMOS Low-Power 60 GHz Transceiver With Integrated Baseband Circuitry", IEEE Journal of Solid-State Circuits, vol. 44, No. 12, Dec. 2009, pp. 3434-3447.

Raczkowski, Kuba et al., "A Wideband Beamformer for a Phased-Array 60GHz Receiver in 40nm Digital CMOS", ISSCC 2010/Session 2/mm-Wave Beamforming & RF Building Blocks/2.2, 2010 IEEE International Solid-State Circuits Conference, Feb. 8, 2010, pp. 40-41 and Figure.

Tabesh, Maryann et al., "A 65 nm CMOS 4-Element Sub-34 mW/Element 60 GHz Phased-Array Transceiver", IEEE Journal of Solid-State Circuits, vol. 46, No. 12, Dec. 2011, pp. 3018-3032.

Szortyka, Viki et al., "Analog Basedband Beamformer for Use in a Phased-Array 60 GHz Transmitter", 2012 IEEE 12th Topical Meeting on Silicon Monolithic Integrated Circuits in RF Systems (SiRF), 2012, pp. 167-170.

PHASED-ARRAY RECEIVER FOR MM-WAVE APPLICATIONS

CROSS-REFERENCE TO RELATED APPLICATIONS

This application claims priority to European Application No. 12172269.8 filed on Jun. 15, 2012 and European Application No. 12189720.1 filed on Oct. 24, 2012, which are incorporated herein by reference in their entirety.

FIELD

The present disclosure is generally related to the field of wireless communication systems for mm-wave applications using phase shifting.

BACKGROUND

The frequency band available around 60 GHz offers up to 9 GHz of bandwidth for use in high-speed wireless communication and negligible interference. 60 GHz band, in comparison with the current low radio-frequency (RF) wireless services, is found as a very promising candidate for very high throughput not only for wireless personal area networks (WPANs), but also for local area networks (LAN). Several industrial and standardization efforts have been carried out, such as IEEE 802.15.3c, ECMA and Wireless-HD, to promote the global use of multi-gigabit 60-GHz wireless technology. Wireless transceivers operating in this frequency range often utilize phased arrays (often referred as beamformers) to relax the wireless link budget. As a result, beamforming circuits are needed in such systems. Beamforming requires two operations: in a transmitter, splitting the signal over the different antenna paths followed by phase shifting the signals, and, in a receiver, phase shifting the signals in the different antenna paths and then combining the signals. The beamformer can be implemented in various ways, e.g. in the signal path at radio frequency (RF), in the local oscillator (LO) path or at analogue baseband (BB). Among these possibilities, analogue baseband beamforming features high robustness, as operations are performed at much lower frequencies than in the other approaches (i.e. at baseband frequency), yielding a low sensitivity to parasitic elements. Another important function in wireless receivers is low-pass filtering required to suppress interferences outside the wanted channel and to avoid aliasing by the sampling action of the analogue-to-digital converter.

Figure 1:
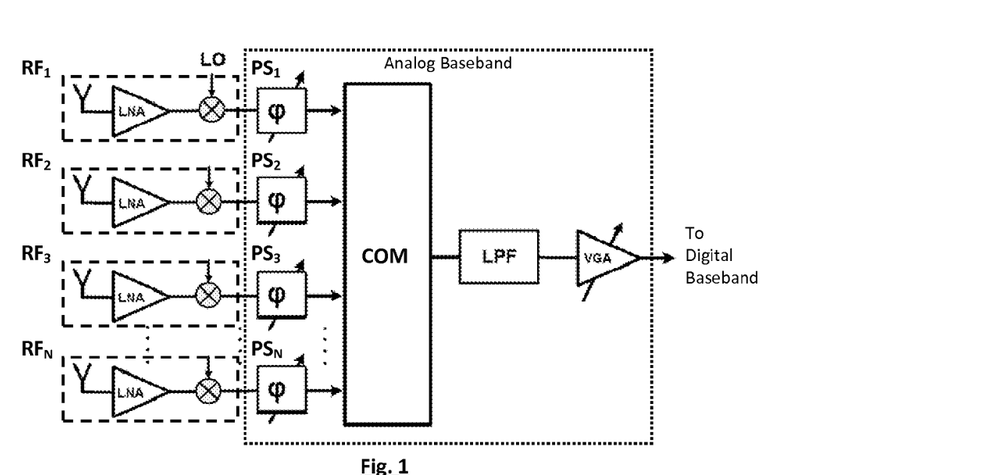
FIG. 1 illustrates a block scheme of a conventional phased-array receiver utilizing analog baseband beamforming.

A block scheme of a conventional wireless receiver utilizing an analogue baseband beamforming and low-pass filtering is shown in FIG. 1. In the different RF front-ends ($RF_1$, $RF_N$) of the receiver the input signal is amplified, downconverted to baseband frequency and then phase-shifted. The signals from the different antenna paths are then combined in the summator (COM), filtered in the low-pass filter (LPF) and further amplified in a variable gain amplifier (VGA).

Figure 2:
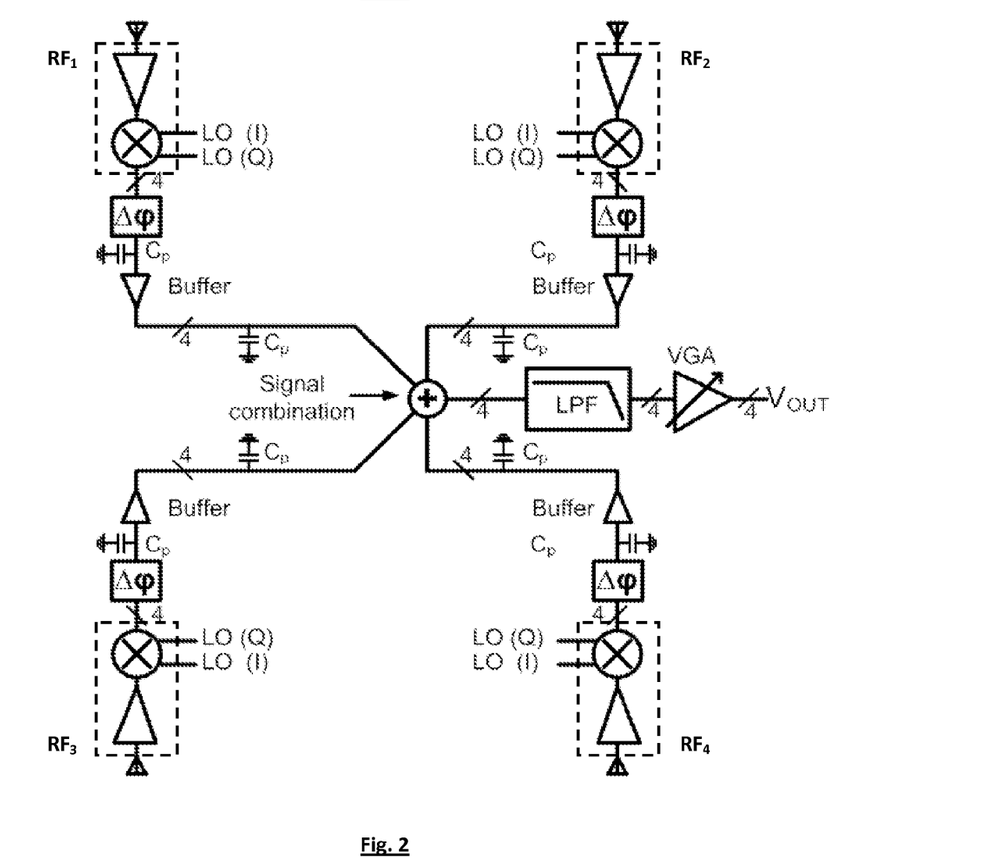
FIG. 2 illustrates an example implementation of a conventional phased-array receiver utilizing analog baseband beamforming.

Patent application EP 2267919 proposes system-on-chip realization of a wireless communication receiver using beamforming shown schematically in FIG. 2, where the RF front-ends are spread across the chip as they are driven by separate antennas and thus long on-chip interconnects are required to drive the signal to the summator (often referred as a combiner) where they are combined. Their inevitable length results in high parasitic capacitance ($C_p$) and greatly limits the signal bandwidth. Additional buffers/amplifiers to compensate for the signal losses are used which however increase the power consumption and degrade the spurious free dynamic range of the receiver. Further, due to stringent requirements of the low-pass filter on noise, cut-off frequency and transfer function shape, the use of large capacitors in the low-pass filter is required which further increases the overall chip area and power consumption.

In the paper "A 900-MHz bandwidth analog baseband circuit with 1-dB step and 30-dB gain dynamic range" (M. Hosoya et al., Proc. 2010 IEEE European Solid-State Circuits Conference, pp. 466-469) an analog baseband section is presented. It implements low-pass filtering, variable gain amplification with a DC offset compensation path. The low-pass filtering is implemented using a classic $g_m$-C topology. The system presented in the paper does not implement any phase shifting. In the paper a single antenna path baseband section is implemented and no issues related to phased array implementation are addressed, e.g. the long interconnects with a parasitic capacitance and combination of the signal of antenna paths placed quite far from each other.

Hence, there is a need for a solution where long on-chip interconnects (and consequently signal degradation) are avoided. In such solution there would be no more need for buffering to compensate for parasitic capacitance. There is a need for a solution that facilitates the implementation of a baseband section for phased arrays.

SUMMARY

It is an object of embodiments of the present disclosure to provide for an improved phased-array communication system using beamforming for mm-wave applications.

The above objective is accomplished by the solution according to the present disclosure.

In a first aspect the disclosure relates to a circuit for providing a signal gain, comprising: a first stage comprising a first set of variable gain transconductors arranged for receiving an input signal and for performing phase-shifting of the input signal, thereby producing an intermediate signal, and a second stage, comprising a second set of transconductors and a plurality of capacitors arranged for receiving the intermediate signal and for providing an output signal to a combiner, wherein the first stage and second stage together form a filter, and wherein the first set of variable gain transconductors and at least one of the transconductors of the second set define the signal gain of the circuit.

In a second aspect the disclosure relates to a circuit for providing a signal gain, comprising: a first stage comprising a plurality of first sets of variable gain transconductors each arranged for receiving an input signal and for performing phase-shifting of the input signal, combining means for combining output signals of the first stage, thereby producing an intermediate signal and a second stage, comprising a second set of transconductors and a plurality of capacitors arranged for receiving the intermediate signal and for providing an output signal. The first stage and second stage together form a filter and the first set of variable gain transconductors and at least one of the transconductors of the second set define the signal gain of the circuit.

In one embodiment the first stage of the circuit comprises multiple first sets of variable gain transconductors arranged for performing beamforming, each set receiving a different input signal and each having outputs connected in parallel, which in combination yield the intermediate signal.

In another embodiment the cut-off frequency and quality factor of the circuit are determined by the second set of transconductors and the plurality of capacitors.

In another aspect the disclosure relates to a wireless phased-array receiver, comprising: at least two front-end circuits each comprising an antenna for receiving an input signal, a low-noise amplifier for amplifying the received input signal and a down-converter for down-converting the amplified signal, each front-end circuit thereby providing an analogue baseband signal, at least one circuit, arranged for receiving as input a plurality of the analogue baseband signals and for performing phase-shifting and filtering on the analogue baseband signals, and an amplifier for amplifying one or more phase-shifted and filtered analogue baseband signals.

In one embodiment, the wireless phased-array receiver further comprises a combiner for combining the one or more phase-shifted and filtered analogue baseband signals.

In another embodiment the combiner comprises an RC filter.

In further embodiment the wireless receiver is adapted for combining the analogue baseband signals after phase-shifting and before filtering.

In a further embodiment the overall transfer function of the at least one circuit takes into account a parasitic capacitance due to on-chip interconnects.

In a further embodiment the wireless phased-array receiver as described is implemented in 40 nm CMOS technology.

In a further aspect the disclosure also relates to a communication network comprising a wireless phased-array receiver as previously described.

For purposes of summarizing the disclosure and the advantages achieved over the prior art, certain objects and advantages of the disclosure have been described herein above. Of course, it is to be understood that not necessarily all such objects or advantages may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other objects or advantages as may be taught or suggested herein.

The above and other aspects of the disclosure will be apparent from and elucidated with reference to the embodiment(s) described hereinafter.

BRIEF DESCRIPTION OF THE FIGURES

The disclosure will now be described further, by way of example, with reference to the accompanying drawings, wherein like reference numerals refer to like elements in the various figures.

DETAILED DESCRIPTION

The present disclosure will be described with respect to particular embodiments and with reference to certain drawings but the disclosure is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

It should be noted that the use of particular terminology when describing certain features or aspects of the disclosure should not be taken to imply that the terminology is being re-defined herein to be restricted to include any specific characteristics of the features or aspects of the disclosure with which that terminology is associated.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Figure 3:
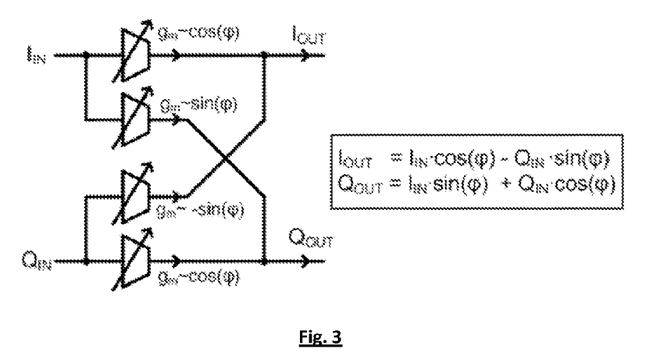
FIG. 3 illustrates an example implementation of a phase-shifter.
Figure 4:
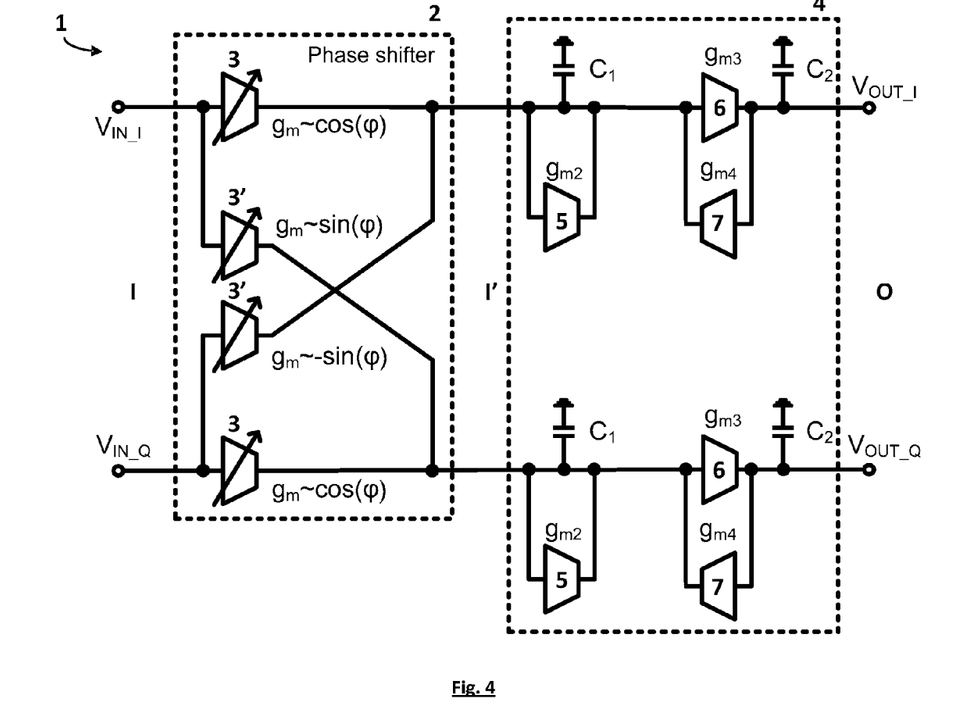
FIG. 4 illustrates an embodiment of a circuit according to the present disclosure.

The present disclosure relates to a circuit (1) incorporating multiple functionalities such as phase shifting, signal combination and low-pass filtering (FIG. 4). The circuit comprises two stages, wherein the first stage is formed by a phase-shifter based on $g_m$ topology, having a set of variable gain transconductors (3,3') as building blocks (shown in FIG. 3) to provide for phase correction. Similarly to the first stage, the second stage is also based on $g_m$-C topology; it comprises transconductors (5,6,7) and capacitors ($C_1$, $C_2$). Here, the first and second stages together form a filter and thus filter out any interference present in the signal. The resulting filter type is defined by the topology of the second stage, thus the circuit may be characterized with e.g. a low-pass or a band-pass filtering functionalities. The filter quality factor Q and cut-off frequency $f_O$ are defined by components used in the second stage while its DC gain by the components used in both stages, i.e. by the transconductance ratio of units (3) and (7).

Figure 5:
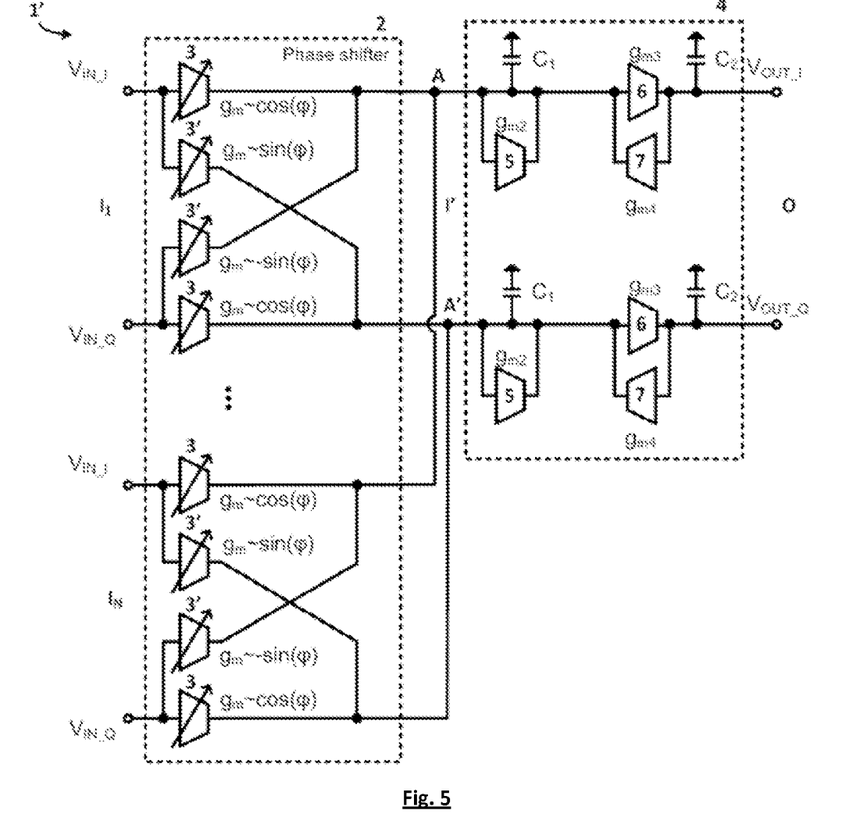
FIG. 5 illustrates another embodiment of a circuit according to the present disclosure.

The first stage of the circuit may comprise multiple first sets of variable gain transconductors (3,3') performing phase-shifting, as shown in FIG. 5. Each first set receives a different input signal ($I_1 \ldots I_N$) at its input and outputs a phase-shifted signal. The outputs of the first sets (A,A') are connected in parallel, which in combination provide intermediate signal I'. Due to the fact the transconductors are used (requiring as input a voltage and providing as an output, a current), the signal combination is achieved simply by connecting together the transconductor outputs.

The present disclosure also relates to a wireless communication receiver using beamforming for mm-wave applications, operable around the 60 GHz band. Wireless transceivers in this frequency range often use phased arrays to relax the link budget. Beamforming circuits are required for performing two operations. In the transmitter the beamformer circuit splits the signal over the different antenna paths and then phase shifts the signals. In the receiver the signals from the different antenna paths are first phase-shifted and then combined. The beamformer can be implemented in various ways, e.g. in the signal path at radio frequency (RF), in the local oscillator (LO) path or at analogue baseband (BB). Among these possibilities, analogue baseband beamforming features high robustness, as operations are performed at much lower frequencies than in the other approaches (i.e. at baseband frequency), resulting in a low sensitivity to parasitic elements.

As already mentioned, conventional wireless phased-array receivers suffer from a still relatively high power and area foot print, partly due to the high parasitic capacitance (CP) of the long on-chip interconnects required to drive the signals from each antenna across the chip. To compensate for the parasitic capacitance additional buffers/amplifiers are required.

Figure 6:
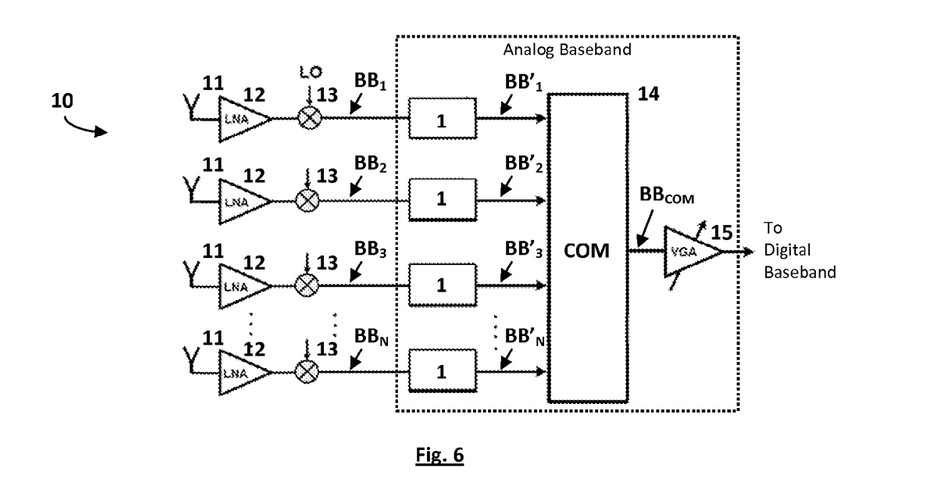
FIG. 6 represents a block scheme of a wireless phased-array receiver comprising a circuit according to the disclosure.
Figure 7:
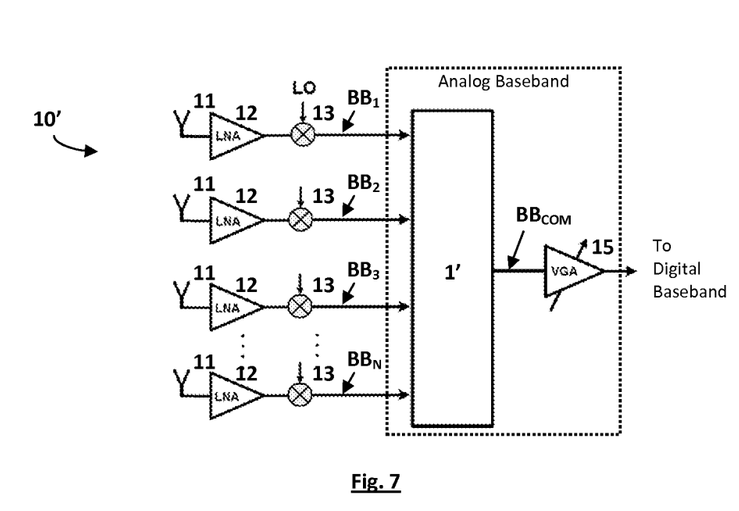
FIG. 7 illustrates another block scheme of a wireless phased-array receiver comprising a circuit according to the disclosure.

The phased-array receiver is implemented using the proposed circuit (see FIG. 6 and FIG. 7). FIG. 6 illustrates a phased-array receiver (10) using the circuit as shown in FIG. 4. In this embodiment the analogue baseband signal ($BB_1, \ldots, BB_N$) from the different antenna paths are phase-shifted and filtered by the circuit (1) and then combined in a combiner (14) outputting a combined phase-shifted and filtered baseband signal ($BB_{COM}$). Advantageously, the signal losses due to parasitic capacitance of the on-chip interconnects, can now be eliminated by taking into account the parasitic capacitance when defining the transfer function of circuit (1). Consequently, the additional amplifiers (buffers) required in conventional implementations to compensate for the signal losses are completely eliminated. Further, in comparison to conventional implementations, the proposed receiver has shorter signal path (i.e. fewer stages) and improved power consumption, area footprint, noise and dynamic range.

FIG. 7 illustrates a phased-array receiver (10') comprising the circuit (1') shown in FIG. 5. Here, the analogue baseband signals ($BB_1, \ldots, BB_N$) received from the different antenna paths are fed into the circuit, which provides directly a phase-shifted, combined and filtered baseband signal ($BB_{COM}$). Again, the signal losses due to parasitic capacitance of the on-chip interconnects, can be eliminated by taking into account the parasitic capacitance when defining the transfer function of the circuit (1).

Figure 8:
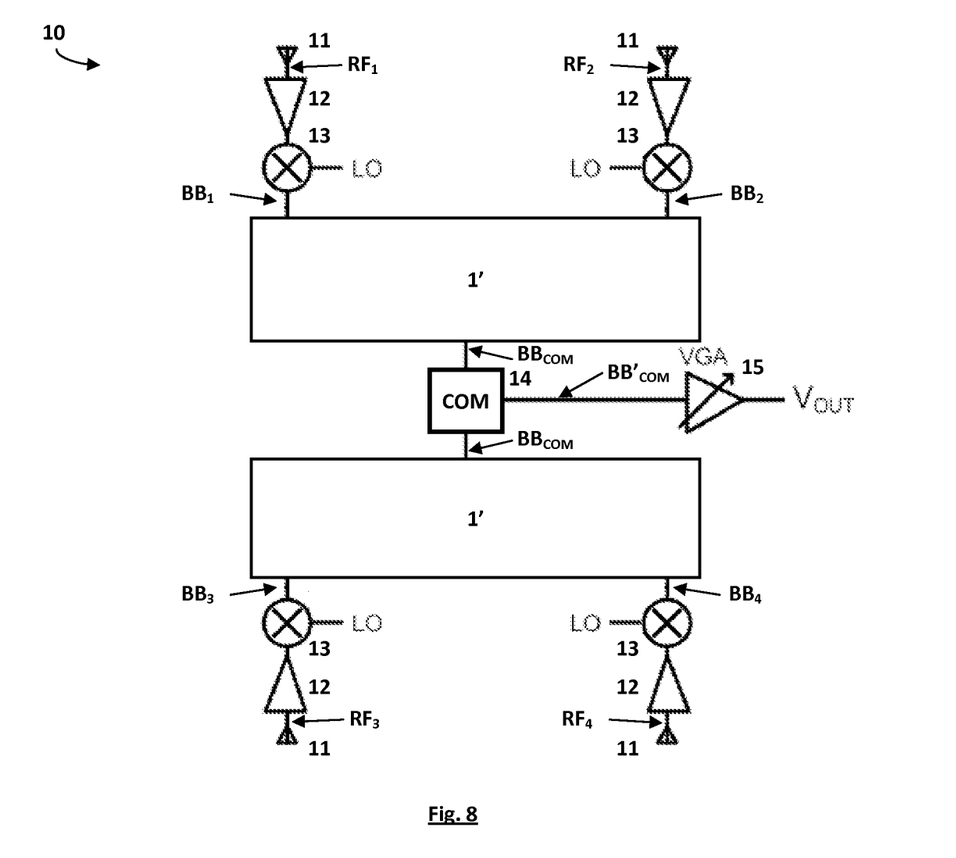
FIG. 8 illustrates a block scheme of a wireless phased-array receiver with four antennas positioned on two sides of the chip using the proposed circuit.
Figure 9:
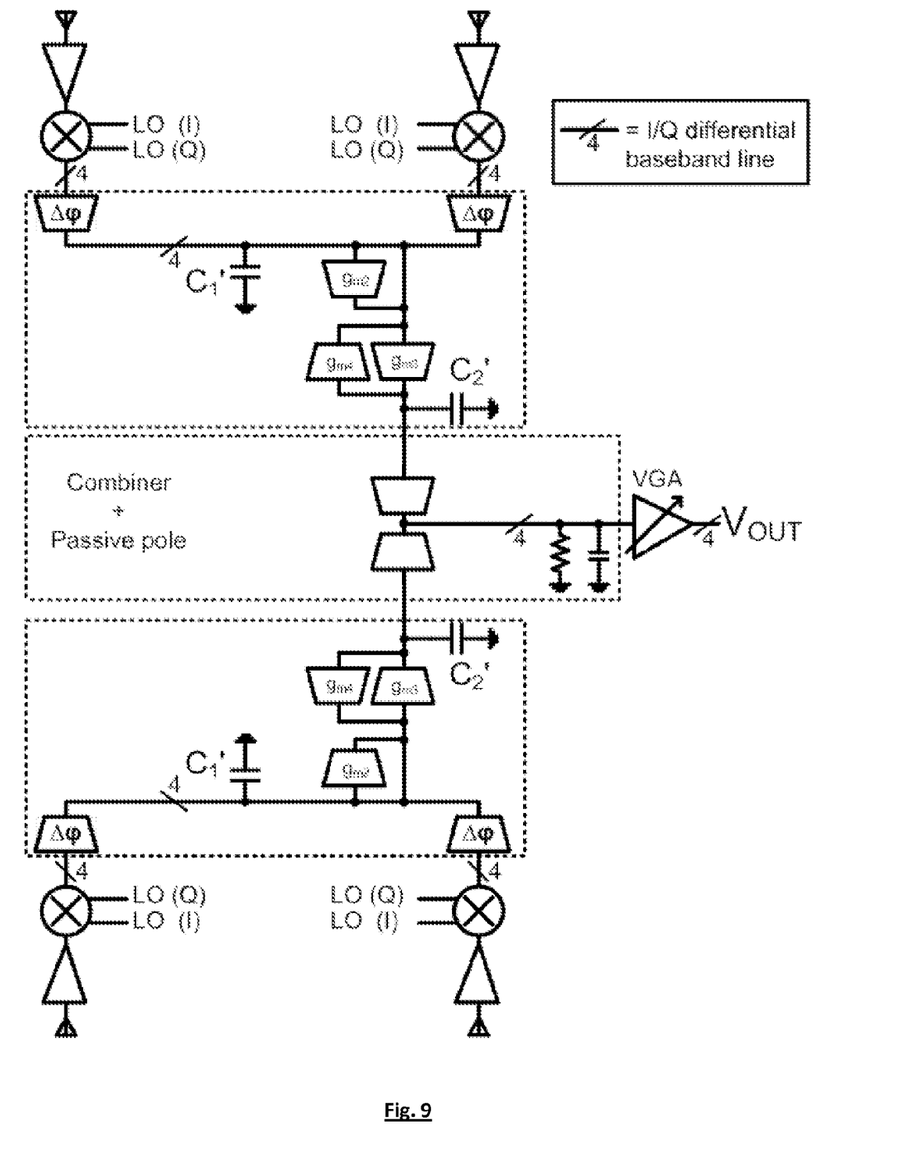
FIG. 9 represents more implementation details of the receiver structure in FIG. 8.

The disclosure will be described more in details below by a receiver design in 40 nm CMOS comprising four antenna paths but it is not limited hereto, as shown in FIG. 8. A more detailed scheme of the phased-array receiver is shown in FIG. 9, where the analogue baseband signals after the down-converters are in IQ (bi-quadratic) differential format. In this example two circuits (1') are incorporated as the antennas are spread across the chip. Advantageously, the long on-chip interconnects required for driving the signal from each antenna paths towards the center of the chip are now incorporated into the capacitors of the filters ($C_1'$, $C_2'$). As shown in FIG. 9, an additional combiner may be required to sum the signals coming from different sides of the chip (e.g. south and north sides), which may further comprise an additional RC filter to further filter out interferences and include the parasitic capacitance ($C_P$). The variable gain amplifier, the last component of the receiver chain, utilizes series-shunt feedback to obtain good linearity. This is important as the amplifier should be able to deliver a full-scale input signal to an ADC (not shown in the figure).

Some more implementation details on the baseband sub-circuits, shown in FIG. 9, are now provided. The mixer is represented by a passive pole which is realized with a poly-silicon resistor and a programmable binary weighted bank of metal-oxide-metal (MOM) capacitors. For the implementation this is considered as the first pole of the total transfer function of the receiver.

Figure 10:
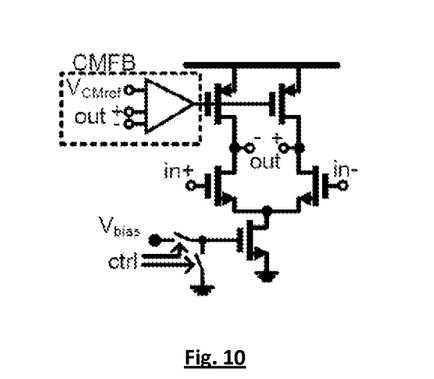
FIG. 10 shows schematic details of a gm-cell.

The proposed circuit realizing low-pass filtering and beamforming is based on a $g_m$-C topology. The input transconductors—the first set of transconductors (3,3')—are identical and are separately driven by the output of a different antenna path ($BB_1$, $BB_2$ and $BB_3$, $BB_4$). The output currents of these transconductors are summed, producing intermediate signal. The second set of transconductors $g_{m2,3,4}$ together with the capacitors $C_1'$ and $C_2'$ form the transfer function of the bi-quadratic filtering section introducing a second and a third filtering poles. In the implementation of the first and second sets of variable transconductors they are digitally controlled—they are programmable. The first stage (3,3') and the second set (5,6,7) comprise a number of identical unit $g_m$ cells as shown in FIG. 10. This is beneficial for robustness as all the circuit parameters that depend of the ratio of transconductors, e.g. DC gain or Q, are well controlled. The unit $g_m$ cell is an NMOS differential pair with built-in common-mode feedback. Each cell is activated by enabling its tail current source. The gain of each transconductance in the circuit is equal to number of active cells times the gain of each unit $g_m$ cell (i.e. $N_{ACTIVE\_CELLS} \cdot g_{mUNIT}$). The phase shift value that is determined by the ratio of transconductors (3,3') is also well controlled. Consequently, the gain of the phase-shifters (3,3') is a digitally programmable value which can be digitally controlled simply by switching on and off unit $g_m$ cells. Thus, calibration of the phase shifter is not necessary. The output of the circuit (1') is the phase-shifted, summed and filtered BB signal. Capacitors $C_1'$ and $C_2'$ may be implemented as a programmable bank of binary weighted metal-oxide-metal (MOM) capacitors. Room is left to absorb interconnect capacitance (parasitic capacitance) into $C_1'$ and $C_2'$.

Figure 11:
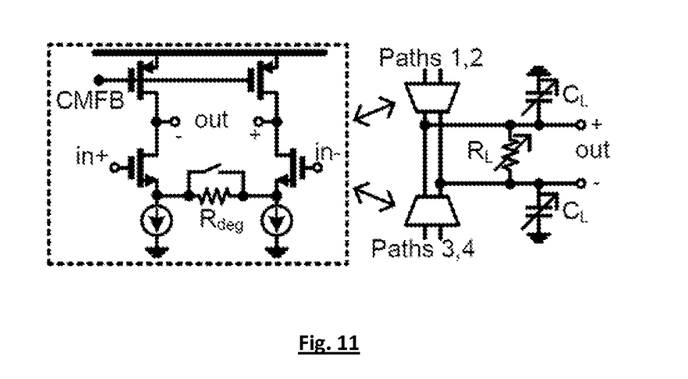
FIG. 11 represents a schematic of the combiner and the additional RC filter.

The output voltage of each low-pass filtering beamformer (1') drives an additional combiner circuit, the implementation of which is shown in FIG. 11. For both I and Q paths the circuit consists of two differential pairs, one for each input, with a programmable source degeneration resistor. The output currents of these two differential pairs are summed in a common RC load, which forms the fourth pole of the complete filter. The gain of the circuit can be varied using digitally controlled resistors. First, the load resistor $R_L$ can be varied, with a corresponding change in $C_L$ to keep the pole at a constant frequency. Moreover, the degeneration resistor $R_{deg}$ can be enabled, further decreasing the gain. The second option also increases the IIP3 (i.e. the input referred third-order intercept point—a linearity measure typically used in wireless communication) of the transconductor for a large signal swing scenario.

As described above, the low-pass filtering functionality of the proposed circuit may be distributed across the whole phased-array receiver chip; in the proposed implementation the filter has four poles. This allows the parasitic capacitance of long interconnects that in prior art solutions need to be buffered using repeaters to be easily incorporated into the capacitors of the filter.

Figure 12:
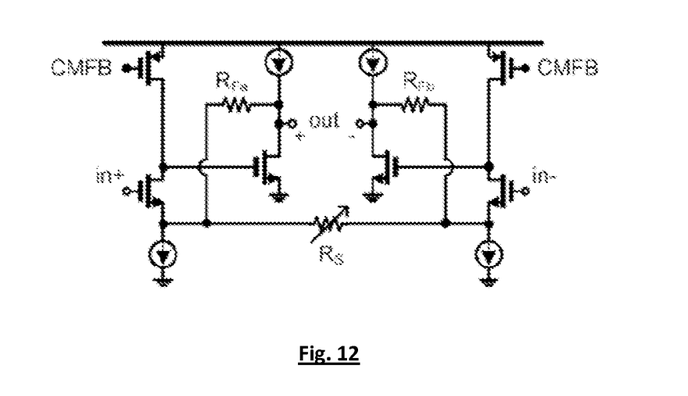
FIG. 12 shows schematic details of a variable gain amplifier (VGA).

The variable gain amplifier that is placed at the end of the chain utilizes series-shunt feedback to obtain good linearity, as shown in FIG. 12. This is important as the amplifier should be able to deliver a full-scale input signal to an ADC. Moreover, the use of feedback reduces PVT (Process, Voltage and Temperature) variations. The voltage gain is approximately equal to:

$$A_V \approx 1 + \frac{R_{Fa,b}}{0.5 \cdot R_S} \quad (1)$$

The gain is controlled by varying the $R_S$ resistor. This is preferable to varying $R_{Fa,b}$, as this would load the output stage excessively in a low gain setting. On the other hand, increasing $R_S$ to decrease the gain value leads to a larger input referred noise, but this is not important as the low-gain setting is only used in a large input swing scenario. The amplifier has a simulated 3 dB bandwidth larger than 2 GHz for all the gain settings and it does not affect the shape of the transfer function inside the passband of the receiver.

Figure 13:
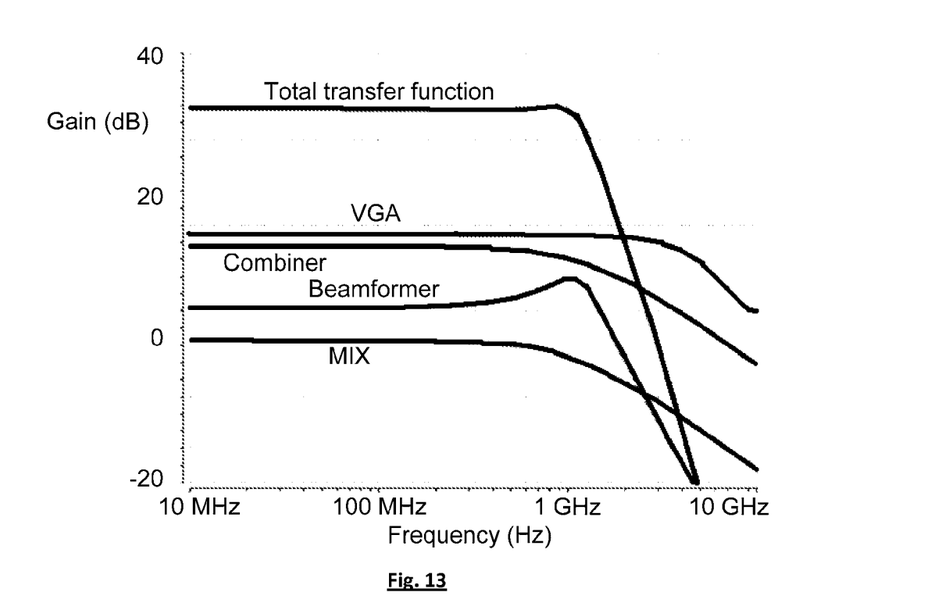
FIG. 13 represents the transfer functions of the receiver's components and the receiver total transfer function.

FIG. 13 shows the transfer function of each component of the analogue baseband circuit of the receiver, i.e. including the two circuits (1'), the additional combiner with the passive RC filter, the VGA and the down-converter, as well as the total transfer function of all components together.

Figure 14:
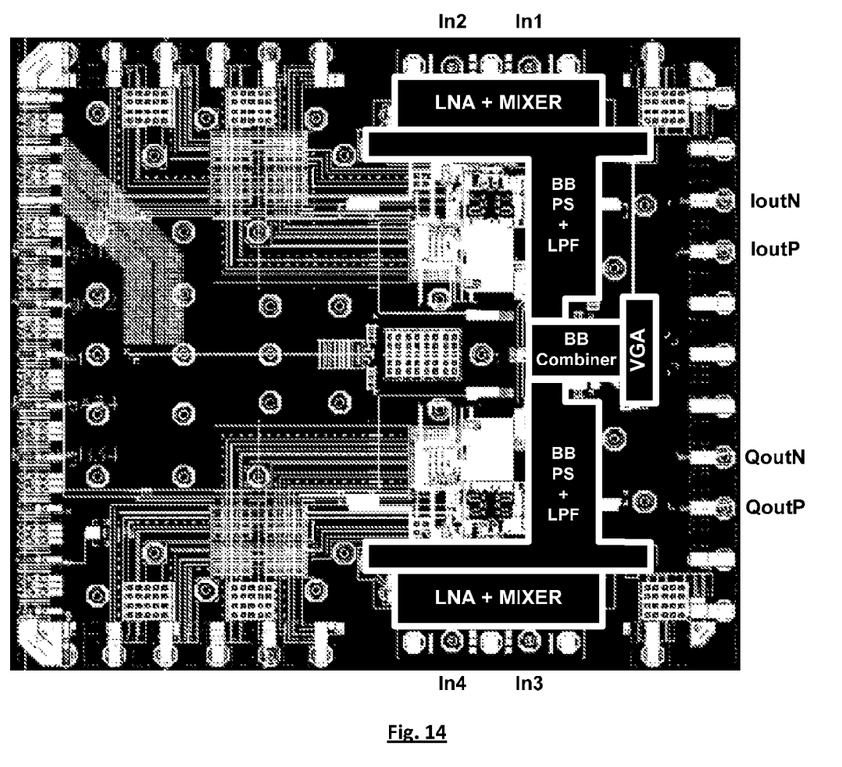
FIG. 14 represents a print layout of the proposed phased-array receiver.

The receiver has been fabricated in a 40 nm low power CMOS technology. A print layout of the chip is shown in FIG. 14. The analogue baseband circuit of the receiver, i.e. including the two circuits (1'), the combiner with the passive RC filter and the VGA, draws between 27 and 38 mA from a 1.1 V supply, depending on the gain setting. The area of the analogue baseband circuit is 0.54 mm$^2$ including digital control using a Network-On-Chip (NOC) and a mixed-signal DC offset compensation (DCOC) loop (not labeled in the figure). The DC gain of the proposed circuit can be programmed between 10.6 dB and 30.0 dB with steps smaller than 0.8 dB, while the cut-off frequency stays between 970 MHz and 1.1 GHz, ensuring sufficient in band gain flatness. A phase shift resolution better than 6.8 degrees (3.1 degrees on average) is obtained with amplitude variation below +/−0.4 dB. Calibration is not necessary thanks to the use of phase shifters in which the phase shift value is determined by a ratio of transconductances made of a certain number of active unit $g_m$-cells. The first stage (2) of the circuit performing phase-shifting uses transconductors with $g_m$ proportional to cos φ or sin φ. Consequently, the number of unit $g_m$ cells that should be activated in each transconductor is calculated using basic trigonometric relations. The resulting values can easily be coded into a look-up table as no calibration is necessary.

While the disclosure has been illustrated and described in detail in the drawings and foregoing description, such illustration and description are to be considered illustrative or exemplary and not restrictive. The foregoing description details certain embodiments of the disclosure. It will be appreciated, however, that no matter how detailed the foregoing appears in text, the disclosure may be practiced in many ways. The disclosure is not limited to the disclosed embodiments.

Other variations to the disclosed embodiments can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A circuit for providing a signal gain, comprising:
   a first stage comprising a first set of variable gain transconductors arranged for receiving an input voltage signal and for performing phase-shifting of the input voltage signal, thereby producing an intermediate current signal, and
   a second stage comprising a second set of transconductors and a plurality of capacitors arranged for receiving the intermediate current signal and for providing an output signal to a combiner,
   wherein the first stage and the second stage together form a filter, and wherein the first set of variable gain transconductors and at least one of the transconductors of the second set are configured to be selectively activated, such that a ratio of activated variable gain transconductors of the first set and at least one activated transconductor of the second set defines a controllable signal gain of the circuit.

2. The circuit of claim 1, wherein the first stage comprises multiple first sets of variable gain transconductors arranged for performing beamforming, each first set receiving a different input signal and each having outputs connected in parallel, which in combination yield the intermediate current signal.

3. The circuit of claim 1, wherein the cut-off frequency and quality factor of the circuit are determined by the second set of transconductors and the plurality of capacitors.

4. The circuit of claim 1, wherein an overall transfer function of the circuit takes into account a parasitic capacitance due to on-chip interconnects, thereby reducing a need for using buffering to compensate for signal losses due to the parasitic capacitance.

5. A circuit for providing a signal gain, comprising:
a first stage comprising a plurality of first sets of variable gain transconductors, each arranged for receiving a respective input voltage signal and for performing phase-shifting of the respective input voltage signal,
combining means for combining outputs signals of the first stage, thereby producing an intermediate current signal, and
a second stage comprising a second set of transconductors and a plurality of capacitors arranged for receiving the intermediate current signal and for providing an output signal to a combiner,
wherein the first stage and the second stage together form a filter, and wherein the plurality of first sets of variable gain transconductors and at least one of the transconductors of the second set are configured to be selectively activated, such that a ratio of activated variable gain transconductors of the plurality of first sets and at least one activated transconductor of the second set defines a controllable signal gain of the circuit.

6. The circuit of claim 5, wherein the first stage comprises multiple first sets of variable gain transconductors arranged for performing beamforming, each first set receiving a different input signal and each having outputs connected in parallel, which in combination yield the intermediate current signal.

7. The circuit of claim 5, wherein the cut-off frequency and quality factor of the circuit are determined by the second set of transconductors and the plurality of capacitors.

8. The circuit of claim 5, wherein an overall transfer function of the circuit takes into account a parasitic capacitance due to on-chip interconnects, thereby reducing a need for using buffering to compensate for signal losses due to the parasitic capacitance.

9. A wireless phased-array receiver, comprising:
at least two front-end circuits each comprising an antenna for receiving an input signal, a low-noise amplifier for amplifying the received input signal, and a down-converter for down-converting the amplified signal, each front-end circuit thereby providing an analogue baseband signal,
at least one circuit arranged for receiving a plurality of analogue baseband signals provided by the at least two front-end circuits and performing phase-shifting and filtering of the plurality of analogue baseband signals, wherein an overall transfer function of the at least one circuit takes into account a parasitic capacitance due to on-chip interconnects, thereby reducing a need for using buffering to compensate for signal losses due to the parasitic capacitance, and
an amplifier for amplifying one or more phase-shifted and filtered analogue baseband signals.

10. The wireless phased-array receiver of claim 9, wherein each of the at least one circuits comprises:
a first stage comprising a first set of variable gain transconductors arranged for receiving an analogue baseband signal and for performing phase-shifting of the analogue baseband signal, thereby producing an intermediate signal, and
a second stage comprising a second set of transconductors and a plurality of capacitors arranged for receiving the intermediate signal and for providing a phase-shifted and filtered analogue baseband signal.

11. The wireless phased-array receiver of claim 9, wherein each of the at least one circuits comprises:
a first stage comprising a plurality of first sets of variable gain transconductors, each arranged for receiving an analogue baseband signal and for performing phase-shifting of the analogue baseband signal,
combining means for combining outputs signals of the first stage, thereby producing an intermediate signal, and
a second stage comprising a second set of transconductors and a plurality of capacitors arranged for receiving the intermediate signal and for providing a phase-shifted and filtered analogue baseband signal.

12. The wireless phased-array receiver of claim 9, further comprising a combiner configured to combine the one or more phase-shifted and filtered analogue baseband signals.

13. The wireless phased-array receiver of claim 12, wherein the combiner comprises an RC filter.

14. The wireless phased-array receiver of claim 9, configured to combine multiple analogue baseband signals after performing the phase-shifting and before performing the filtering.

15. The wireless phased-array receiver of claim 9, wherein the wireless phased-array receiver is implemented in 40 nanometer complementary metal-oxide-semiconductor (CMOS) technology.

16. The wireless phased-array receiver of claim 9, wherein the wireless phased-array receiver is a component of a communication network.

\* \* \* \* \*